US008833651B2

(12) United States Patent  
Brown et al.

(10) Patent No.: US 8,833,651 B2
(45) Date of Patent: *Sep. 16, 2014

(54) CONTROLLING CONNECTIVITY OF A WIRELESS-ENABLED PERIPHERAL DEVICE

(71) Applicant: BlackBerry Limited, Waterloo (CA)

(72) Inventors: Michael Kenneth Brown, Fergus (CA); Herbert Anthony Little, Waterloo (CA); Neil Patrick Adams, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/041,319

(22) Filed: Sep. 30, 2013

(65) Prior Publication Data

US 2014/0027508 A1 Jan. 30, 2014

Related U.S. Application Data

(63) Continuation of application No. 13/612,702, filed on Sep. 12, 2012, now Pat. No. 8,550,342, which is a continuation of application No. 13/371,457, filed on Feb. 12, 2012, now Pat. No. 8,328,093, which is a continuation of application No. 12/790,922, filed on May 31, 2010, now Pat. No. 8,136,731, which is a continuation of application No. 11/106,467, filed on Apr. 15, 2005, now Pat. No. 7,726,566.

(51) Int. Cl.
*G06K 5/00* (2006.01)
*G06F 17/00* (2006.01)
*G06K 7/00* (2006.01)
*G06K 7/08* (2006.01)
*H04B 1/38* (2006.01)
*G06K 19/07* (2006.01)

(52) U.S. Cl.
CPC .......... *G06K 19/0723* (2013.01); *G06K 7/0008* (2013.01)

USPC .......... 235/382; 235/451; 235/435; 235/375; 455/557; 455/558

(58) Field of Classification Search
USPC ................ 455/557, 558, 410, 411, 41.2, 511; 726/16–21; 235/451, 382, 435, 375
See application file for complete search history.

(56) References Cited

U.S. PATENT DOCUMENTS 4,808,803 A 2/1989 Magier et al.
5,193,114 A 3/1993 Moseley
(Continued)

FOREIGN PATENT DOCUMENTS

EP 1041520 10/2000
EP 1713205 10/2006
(Continued)

OTHER PUBLICATIONS

Grimaldo, M., Extended European Search Report for EP 05103026.0, Jan. 11, 2006.

(Continued)

*Primary Examiner* — Daniel Walsh
(74) *Attorney, Agent, or Firm* — Integral Intellectual Property Inc.; Miriam Paton

(57) ABSTRACT

A system includes a wireless-enabled peripheral device configured to be coupled to a personalized security device. The wireless-enabled peripheral device has a wireless communication interface. The system also includes a mobile device configured to establish a wireless connection with the wireless-enabled peripheral device via the wireless communication interface. Upon establishment of the wireless connection, the mobile device is further configured to control establishment of at least one contemporaneous connection of the wireless-enabled peripheral device to one or more other devices attempting to access the personalized security device.

12 Claims, 5 Drawing Sheets

(56) References Cited

U.S. PATENT DOCUMENTS

| | | | |
|---|---|---|---|
| 5,225,664 A | 7/1993 | Iijima | |
| 5,677,524 A | 10/1997 | Haghiri-Tehrani | |
| 6,424,947 B1 | 7/2002 | Tsuria et al. | |
| 6,687,350 B1 | 2/2004 | Landry et al. | |
| 6,836,726 B2* | 12/2004 | Sanchez Peiro | 455/423 |
| 6,942,147 B2* | 9/2005 | Lahteenmaki et al. | 235/441 |
| 7,011,246 B2* | 3/2006 | Nanbu et al. | 235/380 |
| 7,079,810 B2* | 7/2006 | Petite et al. | 455/41.2 |
| 7,188,089 B2 | 3/2007 | Goldthwaite et al. | |
| 7,251,727 B2 | 7/2007 | Adams et al. | |
| 7,266,393 B2 | 9/2007 | Latva-Aho et al. | |
| 7,284,061 B2 | 10/2007 | Matsubayashi et al. | |
| 7,324,488 B1* | 1/2008 | Rubinstein et al. | 370/338 |
| 7,336,973 B2 | 2/2008 | Goldthwaite et al. | |
| 7,439,872 B2 | 10/2008 | Hiltunen | |
| 7,464,865 B2* | 12/2008 | Brown et al. | 235/380 |
| 7,641,111 B2* | 1/2010 | Adams et al. | 235/380 |
| 7,702,312 B2 | 4/2010 | Bollmann et al. | |
| 7,726,566 B2* | 6/2010 | Brown et al. | 235/451 |
| 7,738,926 B2* | 6/2010 | Michel et al. | 455/569.2 |
| 7,792,490 B2* | 9/2010 | Annola et al. | 455/41.2 |
| 7,891,557 B2* | 2/2011 | Brown et al. | 235/380 |
| 8,079,530 B2 | 12/2011 | Adams et al. | |
| 8,095,184 B2* | 1/2012 | Hiltunen et al. | 455/558 |
| 8,112,037 B2* | 2/2012 | Ketari | 455/41.3 |
| 8,136,731 B2* | 3/2012 | Brown et al. | 235/451 |
| 8,160,495 B2* | 4/2012 | Khedouri et al. | 455/41.2 |
| 8,176,182 B2* | 5/2012 | Morita | 709/227 |
| 8,180,279 B2* | 5/2012 | Crowley et al. | 455/9 |
| 8,190,191 B2* | 5/2012 | Livet et al. | 455/550.1 |
| 8,240,560 B2* | 8/2012 | Adams et al. | 235/380 |
| 8,328,093 B2* | 12/2012 | Brown et al. | 235/382 |
| 8,550,342 B2* | 10/2013 | Brown et al. | 235/382 |
| 8,640,950 B2* | 2/2014 | Adams et al. | 235/380 |
| 2001/0008014 A1 | 7/2001 | Farrell et al. | |
| 2001/0054148 A1 | 12/2001 | Hoornaert et al. | |
| 2002/0011516 A1 | 1/2002 | Lee | |
| 2002/0025042 A1* | 2/2002 | Saito | 380/258 |
| 2002/0047045 A1 | 4/2002 | Song et al. | |
| 2002/0090912 A1* | 7/2002 | Cannon et al. | 455/41 |
| 2002/0130176 A1 | 9/2002 | Suzuki | |
| 2002/0166126 A1 | 11/2002 | Pugh et al. | |
| 2002/0174444 A1 | 11/2002 | Gatto et al. | |
| 2003/0093670 A1* | 5/2003 | Matsubayashi et al. | 713/168 |
| 2003/0110512 A1 | 6/2003 | Maari | |
| 2003/0117532 A1* | 6/2003 | Karasawa et al. | 348/734 |
| 2003/0145221 A1 | 7/2003 | Atzmueller et al. | |
| 2003/0183691 A1* | 10/2003 | Lahteenmaki et al. | 235/441 |
| 2004/0019564 A1* | 1/2004 | Goldthwaite et al. | 705/44 |
| 2004/0042604 A1 | 3/2004 | Hiltunen et al. | |
| 2004/0087339 A1* | 5/2004 | Goldthwaite et al. | 455/558 |
| 2004/0112959 A1 | 6/2004 | Jun | |
| 2004/0127256 A1* | 7/2004 | Goldthwaite et al. | 455/558 |
| 2004/0169072 A1 | 9/2004 | Peng | |
| 2004/0188519 A1 | 9/2004 | Cassone | |
| 2004/0203354 A1* | 10/2004 | Yue | 455/41.1 |
| 2004/0214524 A1 | 10/2004 | Noda et al. | |
| 2004/0230489 A1 | 11/2004 | Goldthwaite et al. | |
| 2004/0236547 A1 | 11/2004 | Rappaport et al. | |
| 2005/0015467 A1* | 1/2005 | Noda | 709/220 |
| 2005/0054329 A1 | 3/2005 | Kokudo | |
| 2005/0075985 A1* | 4/2005 | Cartmell | 705/67 |
| 2005/0076212 A1 | 4/2005 | Mishina et al. | |
| 2005/0104717 A1* | 5/2005 | Kaplan | 340/5.74 |
| 2005/0156026 A1 | 7/2005 | Ghosh et al. | |
| 2005/0195975 A1 | 9/2005 | Kawakita | |
| 2005/0268084 A1 | 12/2005 | Adams et al. | |
| 2006/0006230 A1 | 1/2006 | Bear et al. | |
| 2006/0032905 A1 | 2/2006 | Bear et al. | |
| 2006/0059503 A1 | 3/2006 | Will et al. | |
| 2006/0068760 A1* | 3/2006 | Hameed et al. | 455/412.1 |
| 2006/0091200 A1 | 5/2006 | Lai et al. | |
| 2006/0218397 A1* | 9/2006 | Brown et al. | 713/168 |
| 2006/0223566 A1 | 10/2006 | Brown et al. | |
| 2006/0224601 A1* | 10/2006 | Brown et al. | 707/100 |
| 2006/0224892 A1* | 10/2006 | Brown et al. | 713/171 |
| 2006/0225126 A1 | 10/2006 | Brown et al. | |
| 2006/0231623 A1* | 10/2006 | Brown et al. | 235/451 |
| 2006/0233374 A1 | 10/2006 | Adams et al. | |
| 2006/0236117 A1 | 10/2006 | Lazaridis et al. | |
| 2006/0236126 A1 | 10/2006 | Adams et al. | |
| 2007/0028118 A1 | 2/2007 | Brown et al. | |
| 2007/0142095 A1 | 6/2007 | Bollmann et al. | |
| 2007/0152035 A1* | 7/2007 | Adams et al. | 235/380 |
| 2007/0167194 A1 | 7/2007 | Brown et al. | |
| 2007/0197261 A1* | 8/2007 | Humbel | 455/558 |
| 2007/0203836 A1 | 8/2007 | Dodin | |
| 2007/0238418 A1 | 10/2007 | Mizusawa et al. | |
| 2007/0251997 A1* | 11/2007 | Brown et al. | 235/380 |
| 2007/0266247 A1 | 11/2007 | Kirkup et al. | |
| 2007/0271433 A1* | 11/2007 | Takemura | 711/164 |
| 2008/0016368 A1 | 1/2008 | Adams | |
| 2008/0016537 A1 | 1/2008 | Little et al. | |
| 2008/0017711 A1 | 1/2008 | Adams et al. | |
| 2008/0022043 A1 | 1/2008 | Adams et al. | |
| 2008/0094217 A1 | 4/2008 | Okamasu et al. | |
| 2008/0214241 A1* | 9/2008 | Hiltunen et al. | 455/558 |
| 2008/0242365 A1* | 10/2008 | Rokusek et al. | 455/569.1 |
| 2008/0248751 A1* | 10/2008 | Pirzada et al. | 455/41.2 |
| 2009/0001160 A1 | 1/2009 | Davis et al. | |
| 2009/0044268 A1 | 2/2009 | Tak | |
| 2009/0095812 A1 | 4/2009 | Brown et al. | |
| 2009/0240814 A1* | 9/2009 | Brubacher et al. | 709/227 |
| 2009/0268057 A1 | 10/2009 | Wang | |
| 2010/0121725 A1* | 5/2010 | Adams et al. | 705/17 |
| 2010/0155469 A1 | 6/2010 | Ota et al. | |
| 2010/0227558 A1 | 9/2010 | Sueoka et al. | |
| 2010/0237148 A1* | 9/2010 | Brown et al. | 235/435 |
| 2010/0238004 A1 | 9/2010 | Mizoguchi | |
| 2011/0009051 A1* | 1/2011 | Khedouri et al. | 455/3.06 |
| 2011/0014905 A1* | 1/2011 | Eschenauer et al. | 455/418 |
| 2011/0108624 A1* | 5/2011 | Adams et al. | 235/441 |
| 2011/0183619 A1* | 7/2011 | Satoh et al. | 455/41.2 |
| 2011/0210820 A1* | 9/2011 | Talty et al. | 340/5.8 |
| 2011/0254666 A1 | 10/2011 | Ota et al. | |
| 2012/0072350 A1 | 3/2012 | Goldthwaite et al. | |
| 2012/0117616 A1* | 5/2012 | Kirkup et al. | 726/1 |
| 2012/0120180 A1* | 5/2012 | Jin et al. | 348/14.02 |
| 2012/0139713 A1* | 6/2012 | Brown et al. | 340/10.6 |
| 2012/0310835 A1* | 12/2012 | Adams et al. | 705/44 |
| 2013/0001301 A1* | 1/2013 | Brown et al. | 235/375 |
| 2013/0077229 A1* | 3/2013 | Tsai et al. | 361/679.31 |
| 2013/0214908 A9* | 8/2013 | Singh et al. | 340/10.5 |
| 2013/0270343 A1* | 10/2013 | Adams et al. | 235/439 |
| 2014/0027508 A1* | 1/2014 | Brown et al. | 235/382 |
| 2014/0114858 A1* | 4/2014 | Adams et al. | 705/44 |

FOREIGN PATENT DOCUMENTS

| | | |
|---|---|---|
| JP | 2003076956 | 3/2003 |
| WO | 2004012352 | 2/2004 |

OTHER PUBLICATIONS

Preuss, Norbert, Extended European Search Report for EP 06117313.4, May 31, 2007.

* cited by examiner

CONTROLLING CONNECTIVITY OF A WIRELESS-ENABLED PERIPHERAL DEVICE

BACKGROUND OF THE INVENTION

Smart cards are personalized security devices, defined by the ISO7816 standard and its derivatives, as published by the International Organization for Standardization. A smart card may have a form factor of a credit card and may include a semiconductor device. The semiconductor device may include a memory that can be programmed with security information (e.g., a private decryption key, a private signing key, biometrics, etc.) and may include a processor and/or dedicated logic, for example, dedicated decryption logic and/or dedicated signing logic. A smart card may include a connector for powering the semiconductor device and performing serial communication with an external device. Alternatively, smart card functionality may be embedded in a device having a different form factor and different communication protocol, for example a Universal Serial Bus (USB) device.

Access to security information stored on a smart card is controlled by the processor and/or dedicated logic on the smart card. A smart card reader communicates with the processor and/or dedicated logic in order to access the security information stored on the smart card. It may be prudent, therefore, to ensure that access to the smart card reader (with the smart card coupled thereto) is controlled.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

Figure 1:
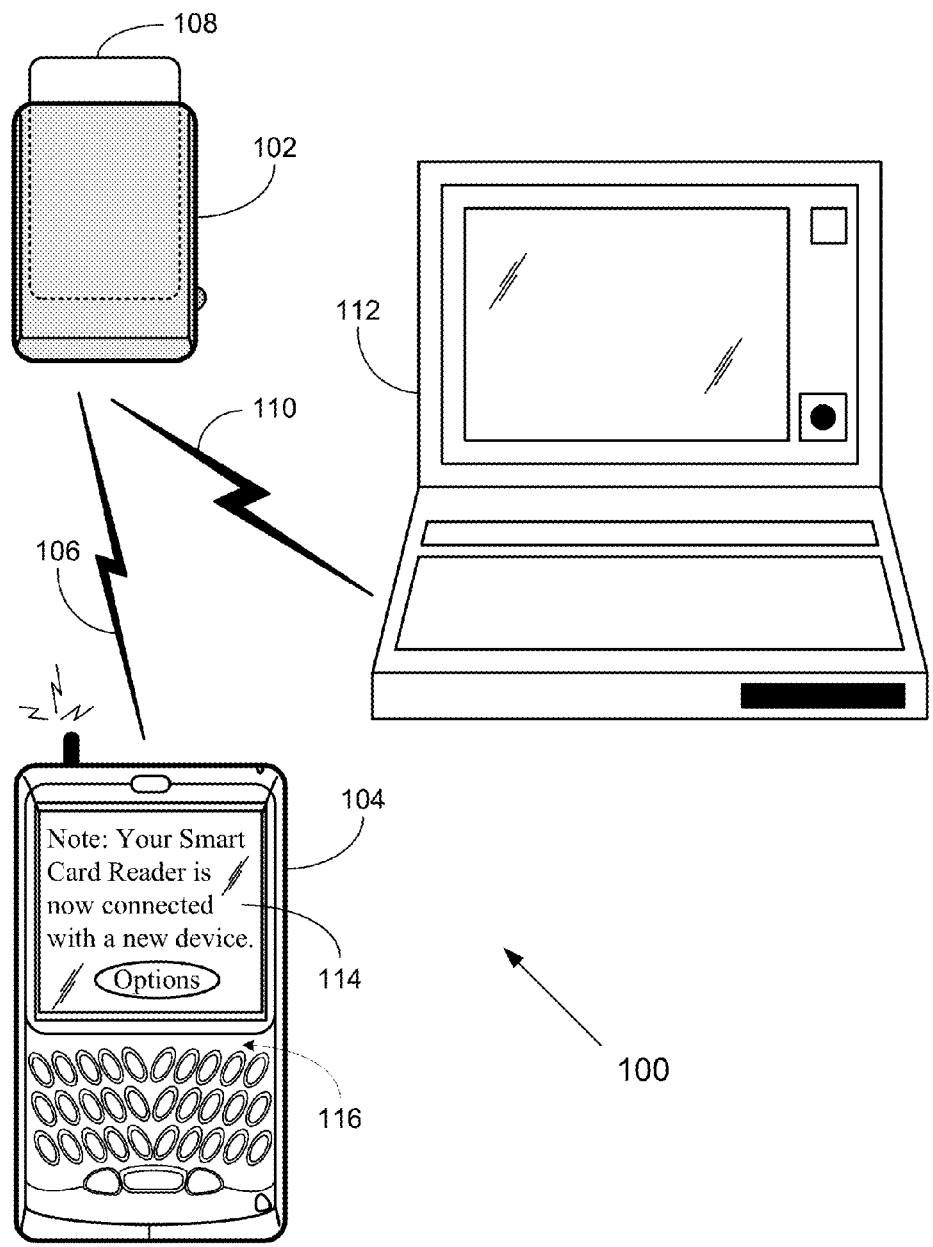
FIG. 1 is a schematic illustration of a system including a wireless-enabled smart card reader and other devices, according to some embodiments of the invention.

FIG. 1 is a schematic diagram of an exemplary system, according to some embodiments of the invention. A system 100 includes a wireless smart card reader 102 and a mobile device 104. Smart card reader 102 and mobile device 104 are able to communicate over a wireless communication link 106. Wireless communication link 106 may be a wireless local area network link or a wireless personal area network link or any other suitable wireless communication link. For example, wireless communications smart card reader 102 and mobile device 104 may be conducted in a manner compatible with the Institute of Electrical and Electronic Engineers (IEEE) for Wireless LAN MAC and Physical layer (PHY) 802.11 a, b, g and n specifications or future related standards, the Bluetooth® standard, the Zigbee™ standard, ultra wideband (UWB) and the like.

A smart card 108 is shown inserted into smart card reader 102. The person whose security information is stored on smart card 108, and is therefore the rightful user of smart card reader 102, may use smart card reader 102 for identification, to unlock mobile device 104, and to digitally sign and/or decrypt messages sent by mobile device 104. Smart card 108 may also include a random number generator.

For example, mobile device 104 may be able to send and receive e-mail messages via an e-mail server (not shown). If, for example, the Secure Multipurpose Internet Mail Extensions (S/MIME) protocol is used, e-mail messages received at mobile device 104 are encrypted using a symmetric algorithm with a random message key generated by the sender of the e-mail message. The e-mail message also includes the message key, encrypted using the public key of the recipient. Upon receipt of an encrypted e-mail message, mobile device 104 may extract the encrypted message key and send it to smart card reader 102 via communication link 106. Smart card reader 102 may send the encrypted message key to smart card 108, and the decryption engine of smart card 108 may decrypt the encrypted message key using the recipient's private decryption key, which is stored in smart card 108. Smart card reader 102 may retrieve the decrypted message key from smart card 108 and forward it to mobile device 104 via communication link 106 so that mobile device 104 can decrypt the received e-mail message. The smart card 108 may prevent unauthorized use of the recipient's private decryption key by requiring that a password or personal identification number (PIN) be supplied before allowing the decryption operation to proceed.

Similarly, to add a digital signature to an e-mail message being sent by mobile device 104, mobile device 104 may send a hash of the contents of the e-mail message to smart card reader 102 over communication link 106. Smart card reader 102 may pass the hash to smart card 108, which may produce a digital signature from the hash and the sender's private signing key, which is stored in smart card 108. Smart card 108 may then pass the digital signature to smart card reader 102, which may forward it to mobile device 104 via communication link 106 so that mobile device 104 can transmit it along with the e-mail message to the e-mail server. Again, smart card 108 may prevent unauthorized use of the recipient's private signing key by requiring that a password or PIN be supplied before allowing the signing operation to proceed.

The unencrypted message key should be sent securely over communication link 106 from smart card reader 102 to mobile device 104 to prevent a third party from retrieving the message key from communication link 106. Similarly, the hash to be signed should be sent authentically over communication link 106 from smart card reader 102 to mobile device 104 to prevent a third party from modifying the hash and thereby causing smart card 108 to produce a signature using a hash different from the hash of the intended message. Therefore communication link 106 may need to be secured using cryptographic techniques.

The person whose security information is stored on smart card 108 may also wish to digitally sign outgoing e-mail sent from a personal computer (not shown) or to decrypt incoming encrypted e-mail received at the personal computer. This will require the personal computer to communicate with smart card reader 102 in much the same way as mobile device 104 communicates with smart card reader 102 as described above. For this purpose, or for other security-related measures (e.g. to permit the person to unlock the personal computer), the communication link between the personal computer and smart card reader 102 may need to be secured using cryptographic techniques.

Smart card reader 102 may be able to maintain dual wireless connections concurrently, one connection to mobile device 104 and another to the personal computer. However, if an attacker were to steal smart card reader 102, establish a wireless connection between smart card reader 102 and another device, and return smart card reader 102 to its rightful user, then as long as smart card reader 102 is within range of the other device, the attacker would have access to smart card reader 102 and smart card 108 without the rightful user of smart card reader 102 being aware of this. Another possibility is that the attacker, having stolen smart card reader 102, could pair smart card reader 102 with the other device in such a way as to facilitate establishment of a wireless connection between smart card reader 102 and the other device, and then return smart card reader 102 to its rightful user. The pairing may occur in a manner that is not wireless, for example, using a USB cable to connect smart card reader 102 briefly to the other device. Once the pairing is complete, the USB cable may be removed, smart card reader 102 may be returned to its rightful user, and a wireless connection between smart card reader 102 and the other device may exist as long as smart card reader 102 is within range of the other device.

One way to handle this potential security issue is to restrict to one the number of wireless connections that smart card reader 102 can make at any given time. In that case, if an attacker establishes a wireless connection 110 between smart card reader 102 and another device, for example, a personal computer 112 belonging to the attacker, the rightful user of smart card reader 102 will be unable to establish a wireless connection between smart card reader 102 and mobile device 104 and will therefore be aware that something is wrong. At this point, the rightful user could repair mobile device 104 and smart card reader 102, thereby removing the existing wireless connection between smart card reader 102 and the other device. Alternatively, the rightful user may notify an administrator of the problem.

Another way to handle this potential security issue is to control the connectivity of smart card reader 102 via mobile device 104 while still enabling smart card reader 102 to maintain more than one wireless connection at a time.

Figure 2:
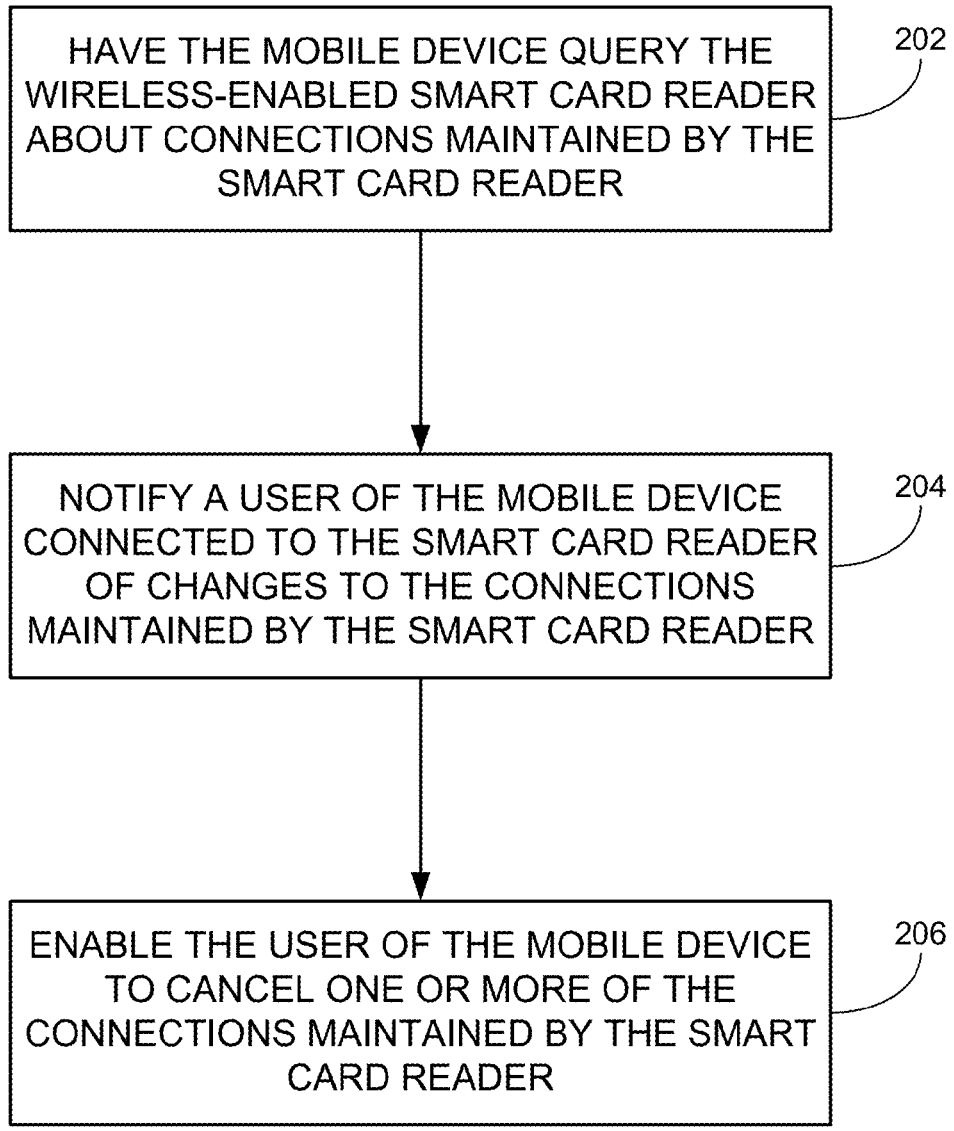
FIG. 2 is a flowchart illustration of a method to be implemented in the system of FIG. 1, according to some embodiments of the invention.

For example, as shown in FIG. 1 and FIG. 2, mobile device 104 may query smart card reader 102 from time to time about any other wireless connections currently maintained by smart card reader 102 (202). Mobile device 104 may show on its display 114 a notification if the information about other wireless connections changes (204). For example, if a new wireless connection is established between smart card reader 102 and another device, display 114 may show a notification such as "Note: Your Smart Card Reader is now connected with a new device". The user may then have the option to review current wireless connections maintained by smart card reader 102 and optionally cancel one or more of the connections (206). Canceling a connection may result in the deletion of pairing keys for that connection.

Figure 3:
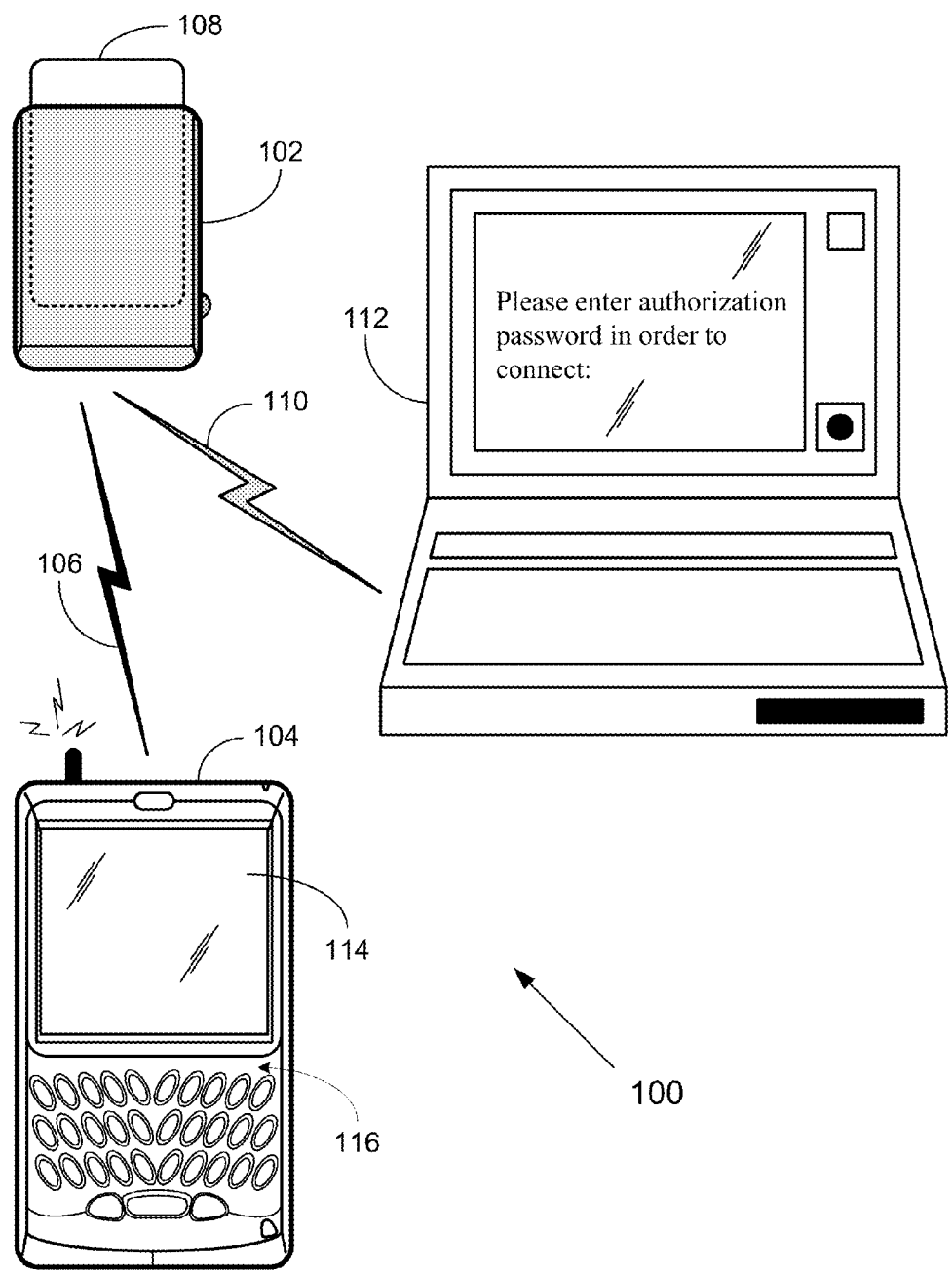
FIG. 3 is a schematic illustration of a system including a wireless-enabled smart card reader and other devices, according to other embodiments of the invention.
Figure 4:
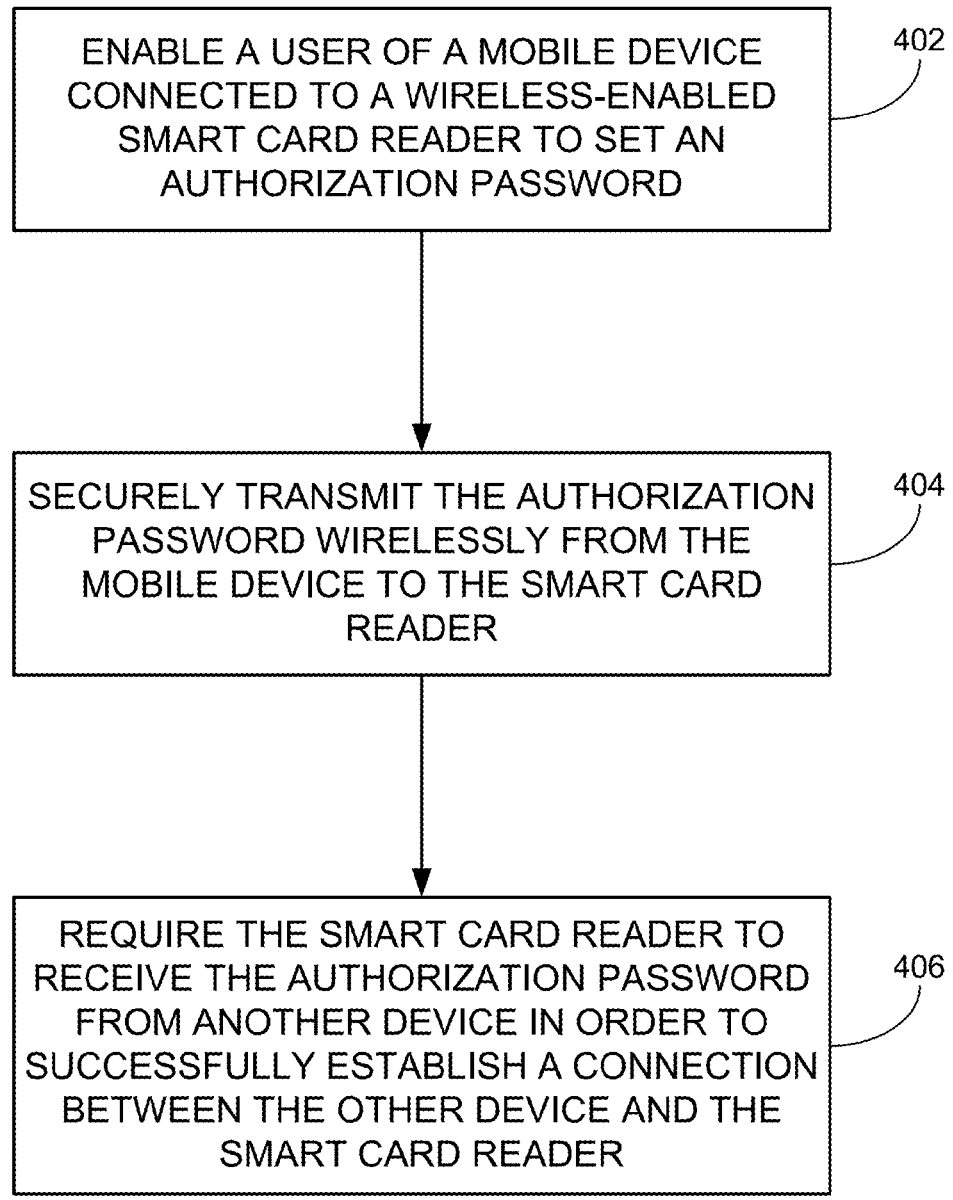
FIG. 4 is a flowchart illustration of a method to be implemented in the system of FIG. 3, according to some embodiments of the invention.

In another example, as shown in FIG. 3 and FIG. 4, mobile device 104 may enable its user to set, via an input component, for example a keyboard 116, an authorization password for subsequent connections to smart card reader 102 (402). Mobile device 104 could send the authorization password securely over communication link 106 to smart card reader 102 (404), and then all subsequent attempts to connect, either wirelessly or via a wired connection, for example a USB cable, to smart card reader 102 will lead to the user of the device trying to connect to smart card reader 102 being prompted for the authorization password (406). If an attacker steals smart card reader 102 and attempts to establish a connection between smart card reader 102 and another device, the attacker will be required to enter the authorization password at the other device in order for the connection to be established successfully (406).

Figure 5:
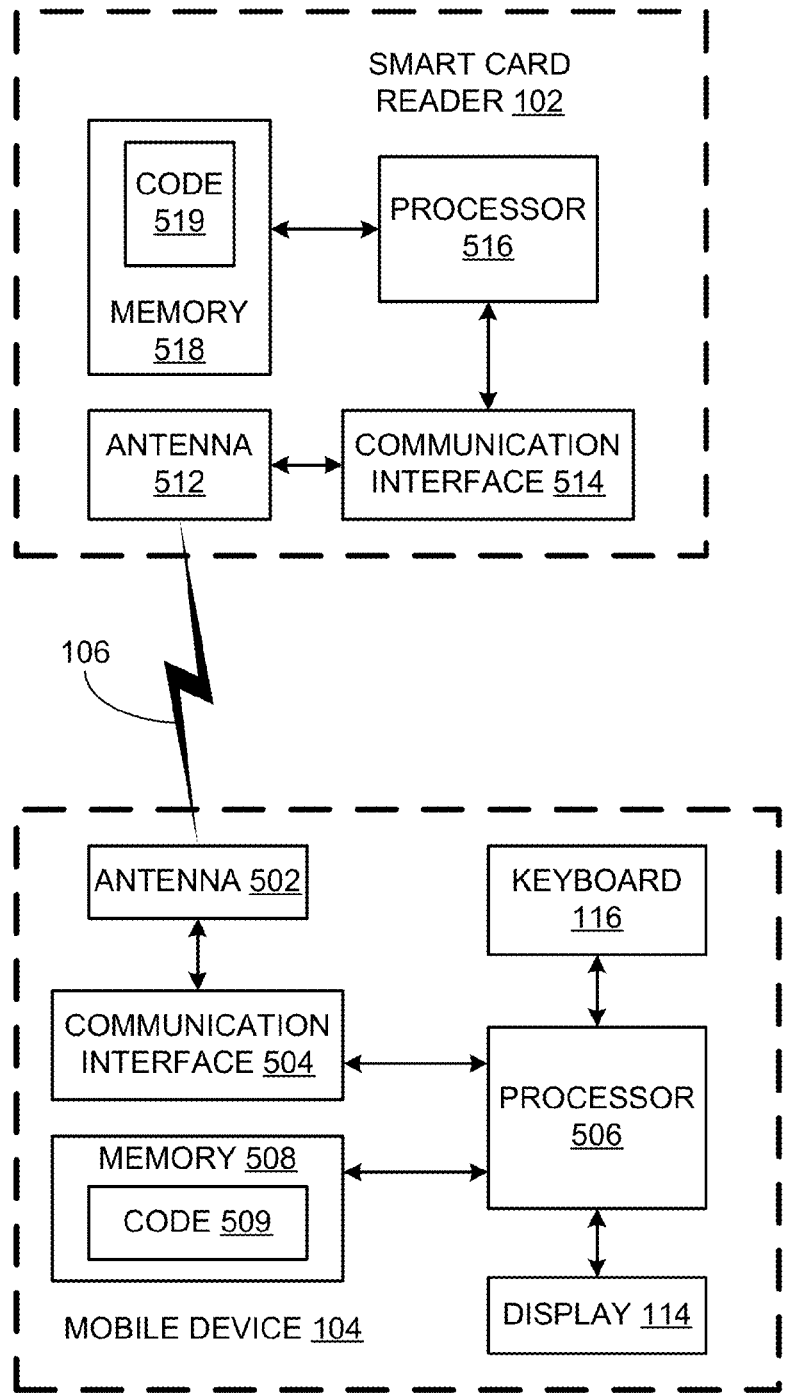
FIG. 5 is a block diagram of the smart card reader and mobile device of FIG. 1 or FIG. 3, according to some embodiments of the invention.

FIG. 5 is a block diagram of portions of system 100, according to some embodiments of the invention. For clarity, some components of mobile device 104 and smart card reader 102 are not shown in FIG. 5 and are not described explicitly below.

Mobile device 104 includes an antenna 502 and smart card reader 102 includes an antenna 512. A non-exhaustive list of examples for antennae 502 and 512 includes dipole antennae, monopole antennae, multilayer ceramic antennae, planar inverted-F antennae, loop antennae, shot antennae, dual antennae, omnidirectional antenna and any other suitable antennae.

Mobile device 104 also includes a communication interface 504 coupled to antenna 502. Smart card reader 102 includes a communication interface 514 coupled to antenna 512. A non-exhaustive list of examples for standards with which communication interfaces 504 and 514 may be compatible includes 802.11 a, b, g and n and future related standards, the Bluetooth® standard, the Zigbee™ standard and the like.

Mobile device 104 also includes a processor 506 coupled to communication interface 504, to display 114 and to keyboard 116. Mobile device 104 also includes a memory 508, which may be fixed in or removable from mobile device 104. Memory 508 may be coupled to processor 506 or partly embedded in processor 506. Communication interface 504 and processor 506 may be part of the same integrated circuit or in separate integrated circuits. Similarly, processor 506 and memory 508 may be part of the same integrated circuit or in separate integrated circuits.

Smart card reader 102 also includes a processor 516 coupled to communication interface 514. Smart card reader 102 also includes a memory 518, which may be fixed in or removable from smart card reader 102. Memory 518 may be coupled to processor 516 or partly embedded in processor 516. Communication interface 514 and processor 516 may be part of the same integrated circuit or in separate integrated circuits. Similarly, processor 516 and memory 518 may be part of the same integrated circuit or in separate integrated circuits.

A non-exhaustive list of examples for processors 506 and 516 includes a central processing unit (CPU), a digital signal processor (DSP), a reduced instruction set computer (RISC), a complex instruction set computer (CISC) and the like. Furthermore, processors 506 and 516 may be part of an application specific integrated circuit (ASIC) or may be a part of an application specific standard product (ASSP).

A non-exhaustive list of examples for memories 508 and 518 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

Memory 508 may store executable code 509 which, when executed by processor 506, may cause mobile device 104 to implement relevant portions of any or a combination of the methods of FIGS. 2 and 4.

Memory 518 may store executable code 519 which, when executed by processor 516, may cause smart card reader 102 to implement relevant portions of any or a combination of the methods of FIGS. 2 and 4.

While certain features have been illustrated and described herein, many modifications, substitutions, changes, and equivalents will now occur to those of ordinary skill in the art without departing from the fair meaning of the accompanying claims.

What is claimed is:

1. A system comprising:
a wireless-enabled peripheral device configured to be coupled to a personalized security device, the wireless-enabled peripheral device having a wireless communication interface; and
a mobile device configured to establish a wireless connection with the wireless-enabled peripheral device via the wireless communication interface,
whereupon establishment of the wireless connection, the mobile device is further configured, to control at least one contemporaneous connection currently established between the wireless-enabled peripheral device and one or more other devices attempting to access the personalized security device, wherein the mobile device is to control the contemporaneous connection by enabling cancellation thereof.

2. The system as claimed in claim 1, wherein the mobile device comprises a display, and wherein, in response to detecting an attempt to establish the wireless connection with the wireless-enabled peripheral device, the mobile device is configured to display on the display a prompt for input of an authorization password.

3. The system as claimed in claim 2, wherein the mobile device comprises an input component and wherein the mobile device is configured to establish the wireless connection with the wireless-enabled peripheral device in response to receiving the authorization password via the input component.

4. The system as claimed in claim 1, wherein the wireless connection between the mobile device and the wireless-enabled peripheral device is a wireless personal area network connection.

5. The system as claimed in claim 1, wherein the wireless connection between the mobile device and the wireless-enabled peripheral device is a wireless local area network connection.

6. The system as claimed in claim 1, wherein at least one of the contemporaneous connections is a direct wired connection.

7. A method to be performed by a mobile device, the method comprising:
establishing a wireless connection with a wireless-enabled peripheral device via a wireless communication interface of the wireless-enabled peripheral device in order for the mobile device to access a personalized security device when the personalized security device is coupled to the wireless-enabled peripheral device; and
upon establishment of the wireless connection, controlling at least one contemporaneous connection currently established between the wireless-enabled peripheral device and one or more other devices attempting to access the personalized security device, wherein controlling the contemporaneous connection comprises enabling cancellation thereof.

8. The method as claimed in claim 7, further comprising:
in response to detecting an attempt to establish the wireless connection with the wireless-enabled peripheral device, displaying a prompt on a display of the mobile device for input of an authorization password.

9. The method as claimed in claim 8, wherein the wireless connection with the wireless-enabled peripheral device is established in response to receiving the authorization password via an input component of the mobile device.

10. The method as claimed in claim 7, wherein the wireless connection between the mobile device and the wireless-enabled peripheral device is a wireless personal area network connection.

11. The method as claimed in claim 7, wherein the wireless connection between the mobile device and the wireless-enabled peripheral device is a wireless local area network connection.

12. The method as claimed in claim 7, wherein at least one of the contemporaneous connections is a direct wired connection.

* * * * *